(12) United States Patent
Yun et al.

(10) Patent No.: US 9,501,238 B2
(45) Date of Patent: Nov. 22, 2016

(54) ELECTRONIC DEVICE AND METHOD OF MANAGING MEMORY OF ELECTRONIC DEVICE

(71) Applicant: Samsung Electronics Co., Ltd., Suwon-si, Gyeonggi-do (KR)

(72) Inventors: Sunghwan Yun, Suwon-si (KR); Seijin Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 14/554,369

(22) Filed: Nov. 26, 2014

(65) Prior Publication Data

US 2015/0149688 A1  May 28, 2015

(30) Foreign Application Priority Data

Nov. 27, 2013 (KR) .................. 10-2013-0145668

(51) Int. Cl.
*G06F 3/06* (2006.01)
(52) U.S. Cl.
CPC ........... *G06F 3/0632* (2013.01); *G06F 3/0605* (2013.01); *G06F 3/0679* (2013.01)
(58) Field of Classification Search
CPC .. G06F 3/0605; G06F 3/0632; G06F 3/0679; G06F 3/01; G06F 3/06; G06F 3/0614–3/0617; G06F 3/0625; G06F 12/00; G06F 12/02; G06F 12/06; G06F 12/12; G06F 15/173; G06F 12/0223; G06F 12/08; G06F 12/0802
See application file for complete search history.

(56) References Cited

U.S. PATENT DOCUMENTS

| | | | |
|---|---|---|---|
| 2005/0235124 A1* | 10/2005 | Pomaranski | G06F 12/06 711/170 |
| 2009/0133031 A1 | 5/2009 | Inoue | |
| 2012/0066658 A1 | 3/2012 | Chowdhury et al. | |
| 2012/0254520 A1 | 10/2012 | Roh et al. | |
| 2013/0086273 A1 | 4/2013 | Wray et al. | |
| 2013/0093778 A1* | 4/2013 | Woo | H04N 21/4424 345/522 |
| 2013/0127707 A1* | 5/2013 | Ketola | G06F 1/1626 345/156 |
| 2013/0254511 A1 | 9/2013 | Das Purkayastha et al. | |
| 2013/0290595 A1* | 10/2013 | Weissman | G06F 17/30 711/6 |
| 2013/0346672 A1* | 12/2013 | Sengupta | G06F 12/0871 711/103 |
| 2014/0344527 A1* | 11/2014 | Kaku | G06F 8/67 711/147 |

FOREIGN PATENT DOCUMENTS

KR  10-2010-0067248 A  6/2010
KR  10-2013-0046459 A  5/2013

* cited by examiner

*Primary Examiner* — Reginald Bragdon
*Assistant Examiner* — Aaron D Ho
(74) *Attorney, Agent, or Firm* — Jefferson IP Law, LLP

(57) ABSTRACT

A method of managing a memory by an electronic device is provided. The method includes configuring a swap data amount per unit time, identifying an actual use amount of swap data, and comparing the identified actual use amount of the swap data with the configured swap data amount per unit time.

14 Claims, 8 Drawing Sheets

ELECTRONIC DEVICE AND METHOD OF MANAGING MEMORY OF ELECTRONIC DEVICE

CROSS-REFERENCE TO RELATED APPLICATION(S)

This application claims the benefit under 35 U.S.C. §119(a) of a Korean patent application filed on Nov. 27, 2013 in the Korean Intellectual Property Office and assigned Serial number 10-2013-0145668, the entire disclosure of which is hereby incorporated by reference.

TECHNICAL FIELD

The present disclosure relates to an electronic device and a method of managing an electronic device. More particularly, the present disclosure relates to a method of using a nonvolatile memory included in an electronic device as a swap memory.

BACKGROUND

In general, recently developed electronic devices, such as smart phones, tablet Personal Computers (PC), Portable Multimedia Players (PMP), Personal Digital Assistants (PDA), laptop PCs, and wearable devices are not only capable of mobility, but may also perform various functions (e.g., games, Social Network Services (SNS), Internet, multimedia, and taking and executing a picture or a video).

Particularly, the electronic device has difficulty in processing various functions through a main memory alone included in the electronic device as demand for functions related to graphic processing and voice processing which require high performance increases.

A swap memory technology using a non-volatile memory as a system memory as well as the main memory may overcome a limit of the memory capacity.

The above information is presented as background information only to assist with an understanding of the present disclosure. No determination has been made, and no assertion is made, as to whether any of the above might be applicable as prior art with regard to the present disclosure.

SUMMARY

By using a non-volatile memory used as a storage device as a swap memory, a design life of the non-volatile memory may be reduced or power consumption may increase due to the use of the non-volatile memory.

Aspects of the present disclosure are to address at least the above-mentioned problems and/or disadvantages and to provide at least the advantages described below. Accordingly, an aspect of the present disclosure is to provide a method of using a swap memory management method in a non-volatile memory for a long time and reducing power consumption by limiting a swap data amount per unit time, and an electronic device using the same.

In accordance with an aspect of the present disclosure, a method of managing a memory by an electronic device is provided. The method includes configuring a swap data amount per unit time, identifying an actual use amount of swap data, and comparing the identified actual use amount of the swap data with the configured swap data amount per unit time.

In accordance with another aspect of the present disclosure, an electronic device is provided. The electronic device includes a non-volatile memory device, and a processor, wherein the processor configures a swap data amount per unit time, identifies an actual use amount of swap data, and compares the identified actual use amount of the swap data with the configured swap data amount per unit time.

In accordance with another aspect of the present disclosure, an electronic device is provided. The electronic device includes a display, a non-volatile memory device, and a processor, wherein the processor displays a swap memory configuration screen on the display and displays at least one application and a swap memory amount per unit time which is configured for the at least one application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (e.g., a Head-Mounted-Device (HMD) such as electronic glasses, electronic clothes, an electronic bracelet, an electronic necklace, an electronic appcessory, an electronic tattoo, a smart watch, and the like).

Figure 1:
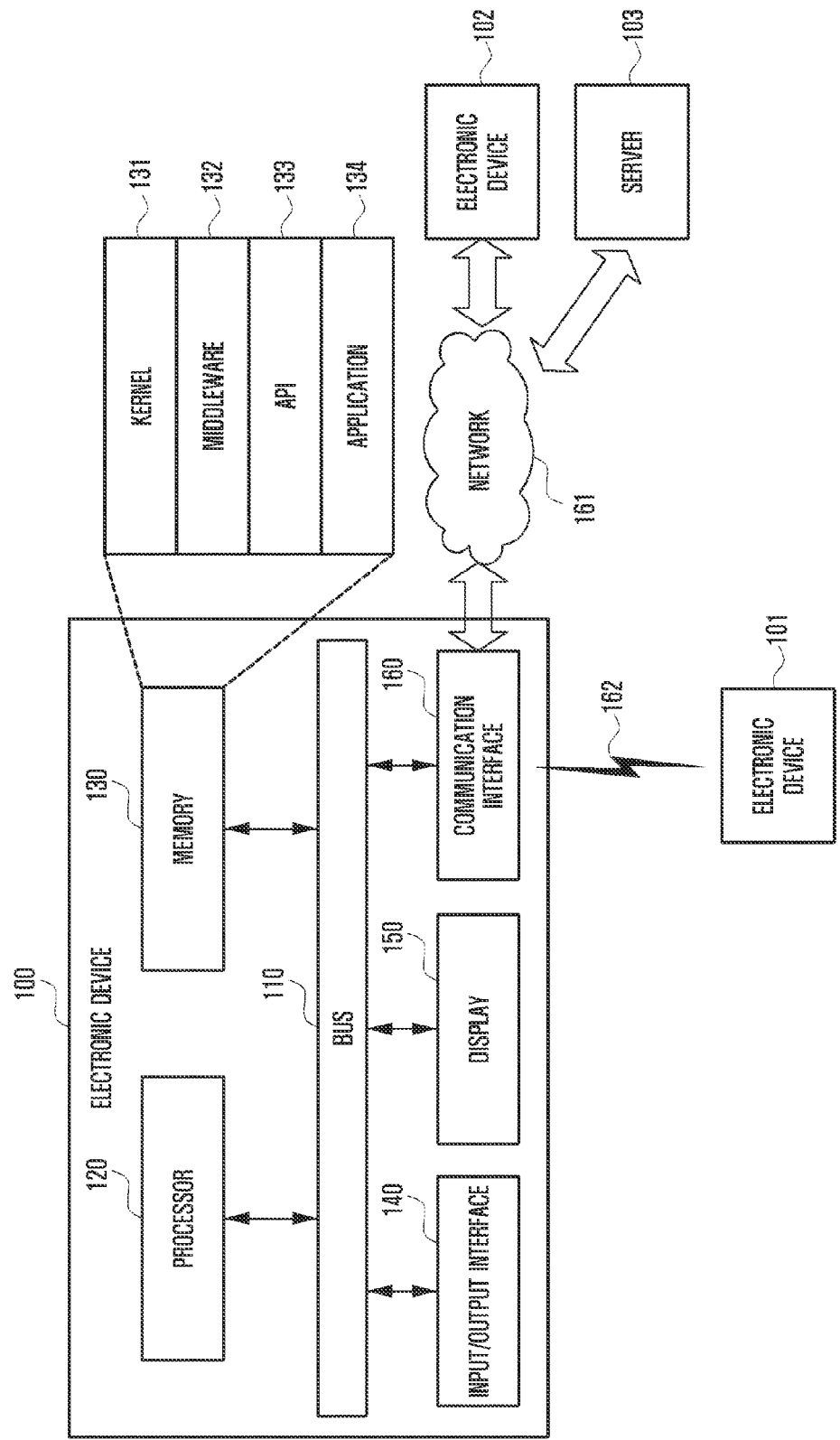
FIG. 1 illustrates a network environment including an electronic device according to various embodiments of the present disclosure.

FIG. 1 illustrates a network environment including an electronic device according to various embodiments of the present disclosure.

Referring to FIG. 1, an electronic device 100 may include a bus 110, a processor 120, a memory 130, an input/output interface 140, a display 150, and a communication interface 160.

The bus 110 may connect components of the electronic device 100, such as the processor 120, the memory 130, the input/output interface 140, the display 150, and the communication interface 160. The bus 110 may be a circuit transmitting communication (e.g., a control message) between the processor 120, the memory 130, the input/output interface 140, the display 150, or the communication interface.

The processor 120 may receive a command of the memory 130, the input/output interface 140, the display 150, and/or the communication interface 160 through the bus 110. The processor 120 may read the received command and perform calculations or data processing according to the command.

The memory 130 may store a command and/or data generated by the processor 120, the input/output interface 140, the display 150, and/or the communication interface 160. The memory 130 may include programming modules, such as a kernel 131, middleware 132, an Application Programming Interface (API) 133, or an application 134.

The kernel 131 may control or manage system resources (e.g., the bus 110, the processor 120, or the memory 130) used for executing an operation or a function implemented by other programming modules (e.g., the middleware 132, the API 133, or the application 134) other than the kernel 131.

The kernel 131 may provide an interface that enables the middle ware 132, the API 133, and/or the application 134 to access an individual component of the electronic device 100 for control or management.

The middle ware 132 may act as a relay so that the API 133 or the application 134 communicates with the kernel 131 to receive and transmit data. In connection with operation requests received from the application 134, the middleware 132 may assign priorities to use system resources (e.g., the bus 110, the processor 120, or the memory 130) of the electronic device 100 to one or more of the applications 134 and control the operation requests (e.g., scheduling or load balancing).

The API 133 is an interface for controlling functions provided by the application 134 in the kernel 131 or the middleware 132. For example, the API 133 may include at least one interface or function (e.g., a command) for file control, window control, image processing, text control and the like.

The application 134 may include a Short Message Service (SMS)/Multimedia Messaging Service (MMS) application, an email application, a calendar application, an alarm application, a health care application (e.g., an application measuring a quantity of exercise or blood sugar) or an environment information application (e.g., an application providing information on pressure, humidity or temperature). Additionally or alternatively, the application 134 may be an application related to an information exchange between the electronic device 100 and an external electronic device (e.g., an electronic device 101 or an electronic device 102). For example, the application related to the information exchange may include a notification relay application for transferring particular information to the external electronic device or a device management application for managing the external electronic device.

For example, the notification relay application may include a function of transmitting notification information generated by another application (e.g., an SMS/MMS application, an email application, a health care application or an environment information application) of the electronic device 100 to the external electronic device (e.g., the electronic device 101 or the electronic device 102). Additionally or alternatively, the notification relay application may receive notification information from the external electronic device (e.g., the electronic device 101 or the electronic device 102) and provide the received notification information to the user. For example, the device management application may manage (e.g., install, remove, or update) at least a part of functions (e.g., turning on/off the external electronic device (or some components of the external electronic device) or controlling a brightness (or resolution) of the display) of the external electronic device (e.g., the electronic device 101 or the electronic device 102) communicating with the electronic device 100, an application executed in the external electronic device, or a service (e.g., a call service or a message service) provided by the external electronic device.

The application 134 may include an application designated according to attributes (the type of the electronic device) of the external electronic device (e.g., the electronic device 101 or the electronic device 102). For example, in a case where the external electronic device is an MP3 player, the application 134 may include an application related to the reproduction of music. Similarly, when the external electronic device is a mobile medical device, the application 134 may include an application related to health care. According to an embodiment, the application 134 may include at least one of an application designated to the electronic device 100 and an application received from the external electronic device (e.g., the electronic device 101 or the electronic device 102).

The input/output interface 140 may transmit a command or data input from the user through an input/output device (e.g., a sensor, a keyboard, or a touch screen) to the processor 120, the memory 130, and/or the communication interface 160 through the bus 110. For example, the input/output interface 140 may provide the processor 120 with data associated with a user's touch input through the touch screen. For example, the input/output interface 140 may output, through the input/output device (e.g., a speaker or the display 150), the command or data received from the processor 120, the memory 130, or the communication interface 160 through the bus 110. For example, the input/output interface 140 may output voice data processed through the processor 120 to the user through the speaker.

The display 150 may display various pieces of information (e.g., multimedia data or text data).

The communication interface 160 may connect communication between the electronic device 100 and the external device (e.g., the electronic device 101, the electronic device 102, and/or a server 103). For example, the communication interface 160 may support network communication 161 (e.g., Internet, Local Area Network (LAN), Wide Area Network (WAN), telecommunication network, cellular network, satellite network, or Plain Old Telephone Service (POTS)), short-range communication 162 (e.g., Wireless Fidelity (WiFi), BlueTooth (BT), Near Field Communication (NFC), or wired communication (e.g., Universal Serial Bus (USB), High Definition Multimedia Interface (HDMI), Recommended Standard (RS)-232, or POTS). According to an embodiment, a protocol (e.g., a short-range communication protocol, a network communication protocol, or a wired communication protocol) for communication between the electronic device 100 and the external device may be supported by at least one of the API 133 and the middleware 132. Each of the electronic devices 101 and 102 may be a device which is the same as the electronic device 100 (e.g., a device of the same type) or another device (e.g., a device of a different type).

Figure 2:
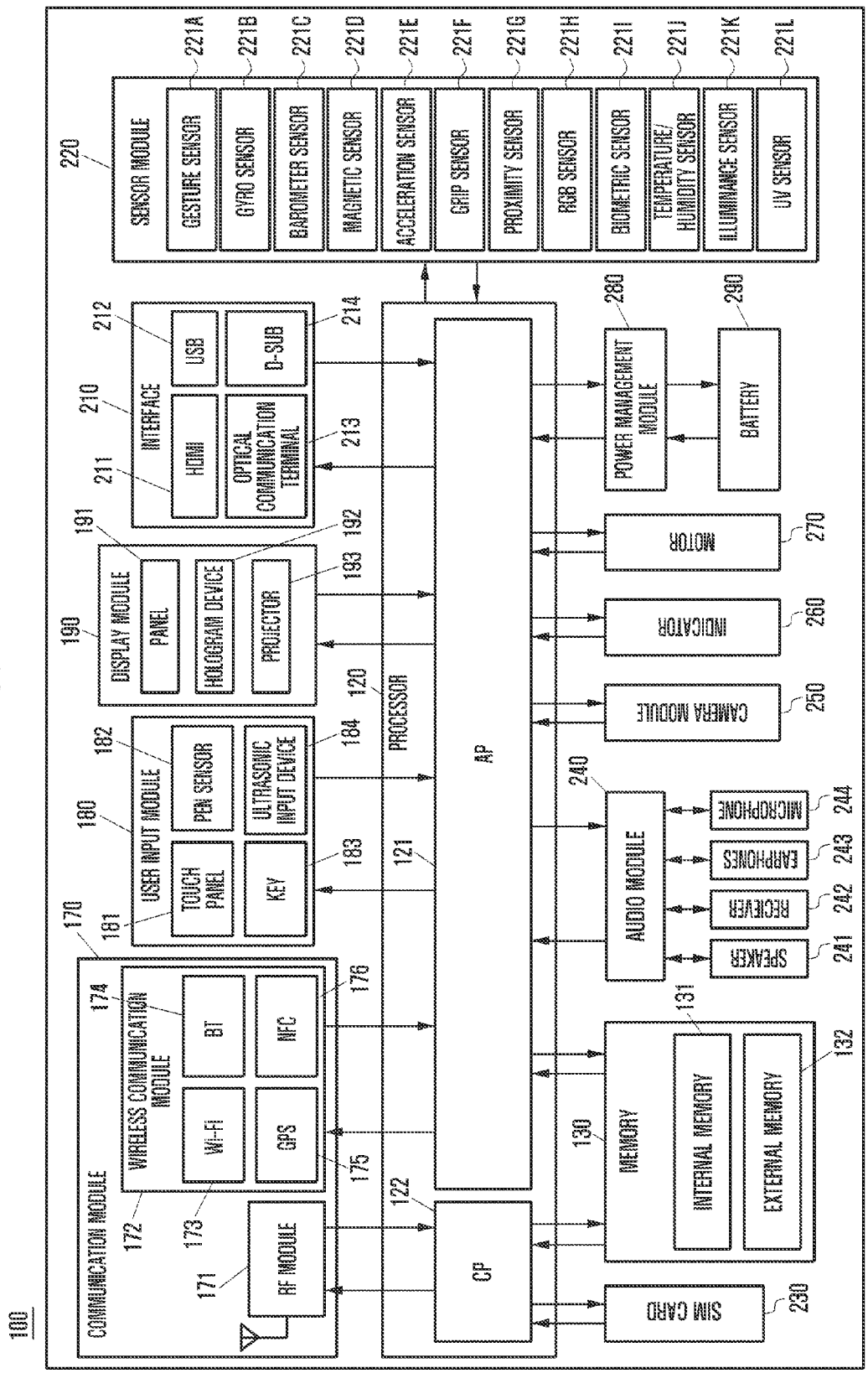
FIG. 2 is a block diagram illustrating a configuration of an electronic device according to various embodiments of the present disclosure.

FIG. 2 is a block diagram illustrating a configuration of an electronic device according to various embodiments of the present disclosure.

Referring to FIG. 2, an electronic device 100 may include one or more processors 120, the memory 130, a communication module 170, a user input module 180, a display module 190, an interface 210, a Subscriber Identification Module (SIM) card 230, a sensor module 220, an audio module 240, a camera module 250, an indicator 260, a motor 270, a power management module 280, and/or a battery 290.

The processor 120 may include one or more Application Processors (APs) 121 or one or more Communication Processors (CPs) 122. In FIG. 2, although the AP 121 and the CP 122 are included within the processor 120, the AP 121 and the CP 122 may be included within different IC packages, respectively. According to an embodiment, the AP 121 and the CP 122 may be included within one IC package.

The AP 121 may control a plurality of hardware or software components connected to the AP 121 by driving an operating system or an application program and process various data including multimedia data and perform calculations. For example, the AP 121 may be implemented by a System on Chip (SoC). According to an embodiment, the processor 120 may further include a Graphic Processing Unit (GPU) (not illustrated).

The CP 122 may perform a function of managing a data link and changing a protocol in communication between different electronic devices (e.g., the electronic device 101, the electronic device 102, and the server 103) connected to the electronic device 100 through the network. For example, the CP 122 may be implemented by a SoC. According to an embodiment, the CP 122 may perform at least some of the multimedia control functions. For example, the CP 122 may distinguish and authenticate electronic devices within a communication network by using a subscriber identification module (e.g., the SIM card 230). Further, the CP 122 may provide a user with services such as voice calls, video calls, text messages, packet data, and the like.

The CP 122 may control data transmission/reception of the communication module 170. Although components such as the CP 122, the memory 130, and the power management module 280 are illustrated as components separated from the AP 121, the AP 121 may include at least some of the above listed components (e.g., the CP 122) in an embodiment.

According to an embodiment, the AP 121 or the CP 122 may load a command or data received from at least one of a non-volatile memory and other components connected to each of the AP 121 and the CP 122 to a volatile memory and process the loaded command or data. Further, the AP 121 or the CP 122 may store data received from or generated by at least one of the other components in a non-volatile memory.

The memory 130 may include an internal memory 131 and an external memory 132. For example, the internal memory 131 may include at least one of volatile memories (e.g., a Dynamic Random Access Memory (DRAM), a Static RAM (SRAM), a Synchronous DRAM (SDRAM) and the like) or non-volatile memories (e.g., a NAND flash memory, a NOR flash memory and the like). According to an embodiment, the internal memory 131 may be a Solid State Drive (SSD). The external memory 132 may further include a flash drive, for example, a Compact Flash (CF), a Secure Digital (SD), a Micro Secure Digital (Micro-SD), a Mini Secure Digital (Mini-SD), an extreme Digital (xD), a memory stick and the like. The external memory 132 may be functionally connected to the electronic device 100 through various interfaces. According to an embodiment, the electronic device 100 may further include a storage device (or storage medium) such as a hard drive.

The communication module 170 (e.g., the communication interface 160 of FIG. 1) may include a Radio Frequency (RF) module 171 or a wireless communication module 172.

The RF module 171 may transmit/receive data and an RF signal. The RF module 171 may include a transceiver, a Power Amp Module (PAM), a frequency filter, a Low Noise Amplifier (LNA) and the like. For example, the wireless communication module 172 may include WiFi 173, BT 174, Global Positioning System (GPS) 175, or NFC 176. For example, the wireless communication module 172 may provide a wireless communication function using a wireless frequency. Additionally and alternatively, the wireless communication module 172 may include a network interface (e.g., a LAN card) or a modem in order to connect the electronic device 100 with a network (e.g., Internet, LAN, WAN, telecommunication network, cellular network, satellite network, POTS and the like).

The user input module 180 may include a touch panel 181, a pen sensor 182, a key 183, and/or an ultrasonic input device 184. For example, the touch panel 181 may recognize a touch input in at least one of a capacitive type, a resistive type, an infrared type, and an acoustic wave type. Further, the touch panel 181 may further include a control circuit. The capacitive type touch panel may recognize physical contact or proximity. The touch panel 181 may further include a tactile layer. In this case, the touch panel 181 may provide a user with a tactile reaction. The pen sensor 182 may be implemented using a method identical or similar to a method of receiving a touch input of a user, or using a separate recognition sheet. For example, the key 183 may include a physical button, an optical key, a keypad, or a touch key. The ultrasonic input device 184 is a device, which may detect an acoustic wave by a microphone 244 through an input means generating an ultrasonic signal to identify data and may perform wireless recognition. According to an embodiment, the electronic device 100 may use the communication module 170 to receive a user input from an external device connected thereto (e.g., a network, a computer, or a server).

The display module 190 (e.g., the display 150 of FIG. 1) may include a panel 191, a hologram device 192, and/or a projector 193. For example, the panel 191 may be a Liquid Crystal Display (LCD), an Active Matrix Organic Light Emitting Diode (AM-OLED) and the like. For example, the panel 191 may be implemented to be flexible, transparent, and/or wearable. The panel 191 and the touch panel 181 may be constructed as one module. The hologram device 192 may show a three-dimensional image in the air using interference of light. The projector 193 may project light on a screen to display an image. For example, the screen may be located inside or outside the electronic device 100. According to an embodiment, the display module 190 may further include a control circuit for controlling the panel 191, the hologram device 192, and/or the projector 193.

The interface 210 may include a High-Definition Multimedia Interface (HDMI) 211, a Universal Serial Bus (USB) 212, an optical communication terminal 213, and/or a D-subminiature (D-sub) 214. For example, the interface 210 may be included in the communication interface 160 illustrated in FIG. 1. Additionally or alternatively, the interface 210 may include a Mobile High-definition Link (MHL), a SD/Multi-Media Card (MMC), or an Infrared Data Association (IrDA).

The sensor module 220 may measure a physical quantity or detect an operation state of the electronic device 100 and may convert the measured and/or detected information to an electronic signal. For example, the sensor module 220 may include at least one of a gesture sensor 221A, a gyro sensor 221B, an atmospheric pressure sensor 221C, a magnetic sensor 221D, an acceleration sensor 221E, a grip sensor 221F, a proximity sensor 221G, a color sensor 221H (e.g., a Red/Green/Blue (RGB) sensor), a bio-sensor 221I, a temperature/humidity sensor 221J, an illumination sensor 221K, and an Ultra Violet (UV) sensor 221L. Additionally or alternatively, the sensor module 220 may include an E-nose sensor, an electromyography (EMG) sensor, an electroencephalogram (EEG) sensor, an electrocardiogram (ECG) sensor, an infrared (IR) sensor, an iris sensor, a fingerprint sensor and the like. The sensor module 220 may further include a control circuit for controlling one or more sensors included in the sensor module 220.

The SIM card 230 may be a card including a subscriber identification module, and may be inserted into a slot formed in a particular portion of the electronic device. The SIM card 230 may include unique identification information (e.g., an Integrated Circuit Card IDentifier (ICCID)) or subscriber information (e.g., International Mobile Subscriber Identity (IMSI)).

The audio module 240 may bi-directionally convert a sound and an electrical signal. For example, at least some components of the audio module 240 may be included in the input/output interface 140 illustrated in FIG. 1. The audio module 240 may process sound information input/output through the speaker 241, the receiver 242, the earphones 243, and/or the microphone 244.

The camera module 250 is a device, which may photograph a still image and a moving image. According to an embodiment, the camera module 250 may include one or more image sensors (e.g., a front sensor or a back sensor), a lens, an Image Signal Processor (ISP), or a flash (e.g., an LED or a xenon lamp).

The indicator 260 may show particular statuses (e.g., a booting status, a message status, a charging status and the like) of the electronic device 100 or a part (e.g., the AP 121) of the electronic device 100. The motor 270 may convert an electrical signal into a mechanical vibration.

The power management module 280 may manage power of the electronic device 100. The power management module 280 may include a Power Management Integrated Circuit (PMIC), a charger Integrated Circuit (IC), a battery and/or fuel gauge. Charging methods may be classified into a wired charging method and a wireless charging method. The charger IC may charge a battery and prevent over voltage or over current from flowing in from a charger. According to an embodiment, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging (e.g., a coil loop circuit, a resonance circuit, a rectifier circuit and the like) may be added. The battery gauge may measure the remaining amount of battery 290, and the charging voltage and current, or the temperature.

The battery 290 may store or generate electricity and may supply power to the electronic device 100 by using the stored or generated electricity. The battery 290 may include a rechargeable battery and/or a solar battery.

The electronic device 100 may include a processing unit (e.g., GPU) for supporting mobile TV. For example, the processing unit for supporting the mobile TV may process media data according to a standard of Digital Multimedia Broadcasting (DMB), Digital Video Broadcasting (DVB), media flow and the like.

Figure 3:
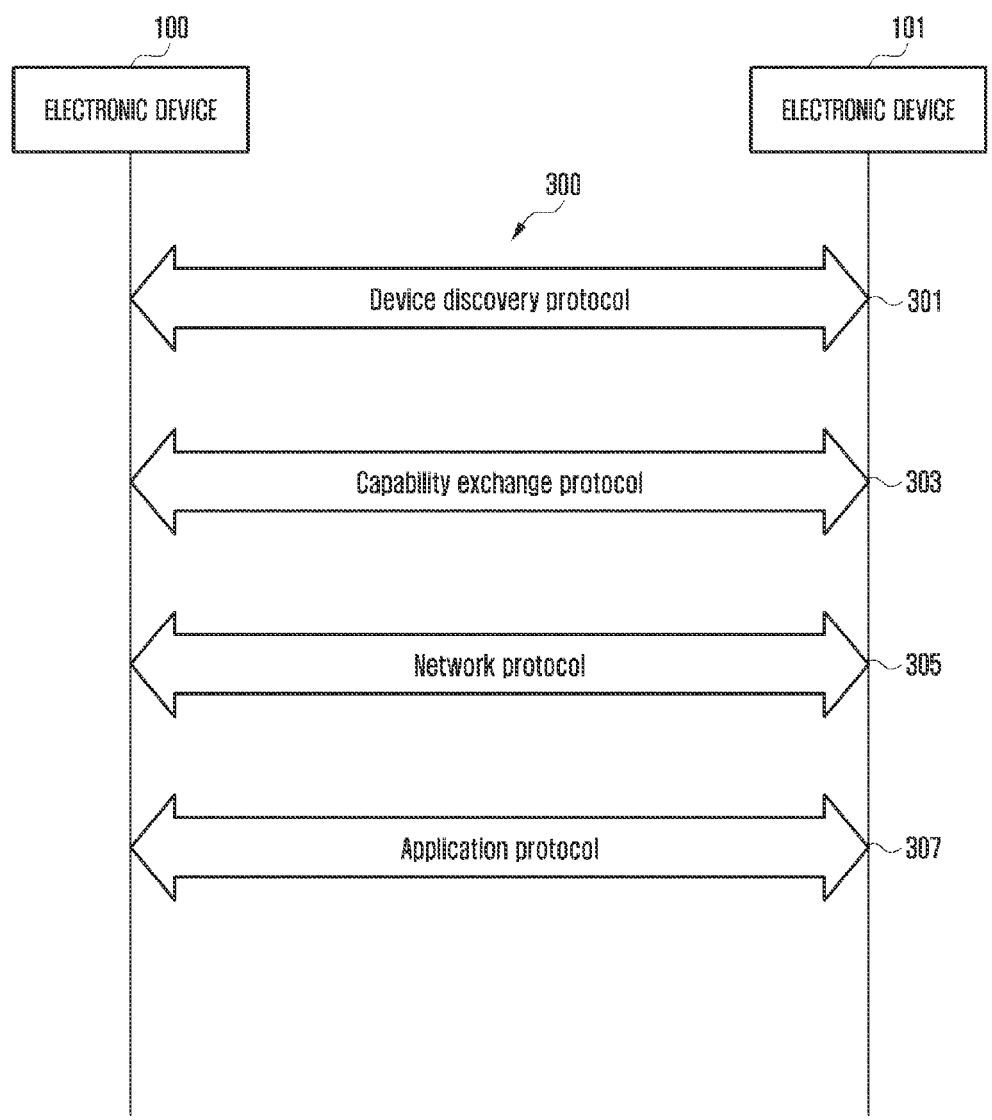
FIG. 3 schematically illustrates a communication protocol between electronic devices according to various embodiments of the present disclosure.

FIG. 3 illustrates a communication protocol between electronic devices according to various embodiments of the present disclosure.

Referring to FIG. 3, a communication protocol 300 between electronic devices 100 and 101 may include a device discovery protocol 301, a capability exchange protocol 303, a network protocol 305, and an application protocol 307.

The communication protocol 300 may be a protocol for detecting an external electronic device capable of communicating with the electronic devices 100 and 101 or connecting the detected external electronic device with the electronic devices 100 and 101. For example, the electronic device 100 may detect another electronic device 101 which may perform communication, through a communication method (e.g., WiFi, BT, USB and the like), which the electronic device 100 is able to use, by using the device discovery protocol 301. For a communication connection with another electronic device 101, the electronic device 100 may acquire identification information of the electronic device 101 detected through the device discovery protocol 301 and store the acquired identification information. For example, the electronic device 100 may establish the communication connection with another electronic device 101 at least based on the identification information.

According to an embodiment, the device discovery protocol 301 may be a protocol for authenticating a plurality of electronic devices. For example, the electronic device 100 may perform authentication between the electronic device 100 and another electronic device 101 based on communication information (e.g., a Media Access Control (MAC) address, a Universally Unique IDentifier (UUID), a SubSystem IDentification (SSID), and an Internet Protocol (IP) address). According to an embodiment, the capability exchange protocol 303 may be a protocol for exchanging information related to a service function which is supported by at least one of the electronic device 100 and another electronic device 101. For example, the electronic device 100 or another electronic device 101 may exchange information related to a service function currently provided by each of the electronic device 100 and the electronic device 101 through the capability exchange protocol 303. The exchangeable information may include identification information indicating a particular service among a plurality of services, which may be supported by the electronic device 100 or the other electronic device 101. For example, the electronic device 100 may receive, from the other electronic device 101, identification information of a particular service provided by the other electronic device 101 through the capability exchange protocol 303. In this case, the electronic device 100 may determine if the electronic device 100 may support the particular service based on the received identification information.

According to an embodiment, the network protocol 305 may be a protocol for controlling the flow of data transmitted/received to provide services linked between the electronic devices connected to communicate with each other (e.g., another electronic device may be the electronic device 102 or the server 103 as well as the electronic device 101). For example, at least one of the electronic device 100 and another electronic device 101 may control an error or data quality by using the network protocol 305. Additionally or alternatively, the network protocol 305 may determine a transport format of data transmitted/received between the electronic device 100 and the electronic device 101. Further, at least one of the electronic device 100 and the electronic device 101 may at least manage a session (e.g., connect or terminate a session) for a data exchange between the electronic devices by using the network protocol 305.

According to an embodiment, the application protocol 307 may be a protocol for providing a process or information for exchanging data related to a service provided to an external electronic device. For example, the electronic device 100 may provide a service to another electronic device 101 (e.g., in addition to the electronic device 101, another electronic device may be the electronic device 102 or the server 103) through the application protocol 307.

According to an embodiment, the communication protocol 300 may include a communication protocol designated by an individual or organization (e.g., a communication protocol self-designated by a communication device manufacturing company or a network supplying company) or a combination thereof.

The term "module" used in the present disclosure may refer to, for example, a unit including a combination of one or more of hardware, software, and firmware. The term "module" may be interchangeable with a term such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGAs), and a programmable-logic device for performing operations which have been already known or are to be developed in the future.

Figure 4:
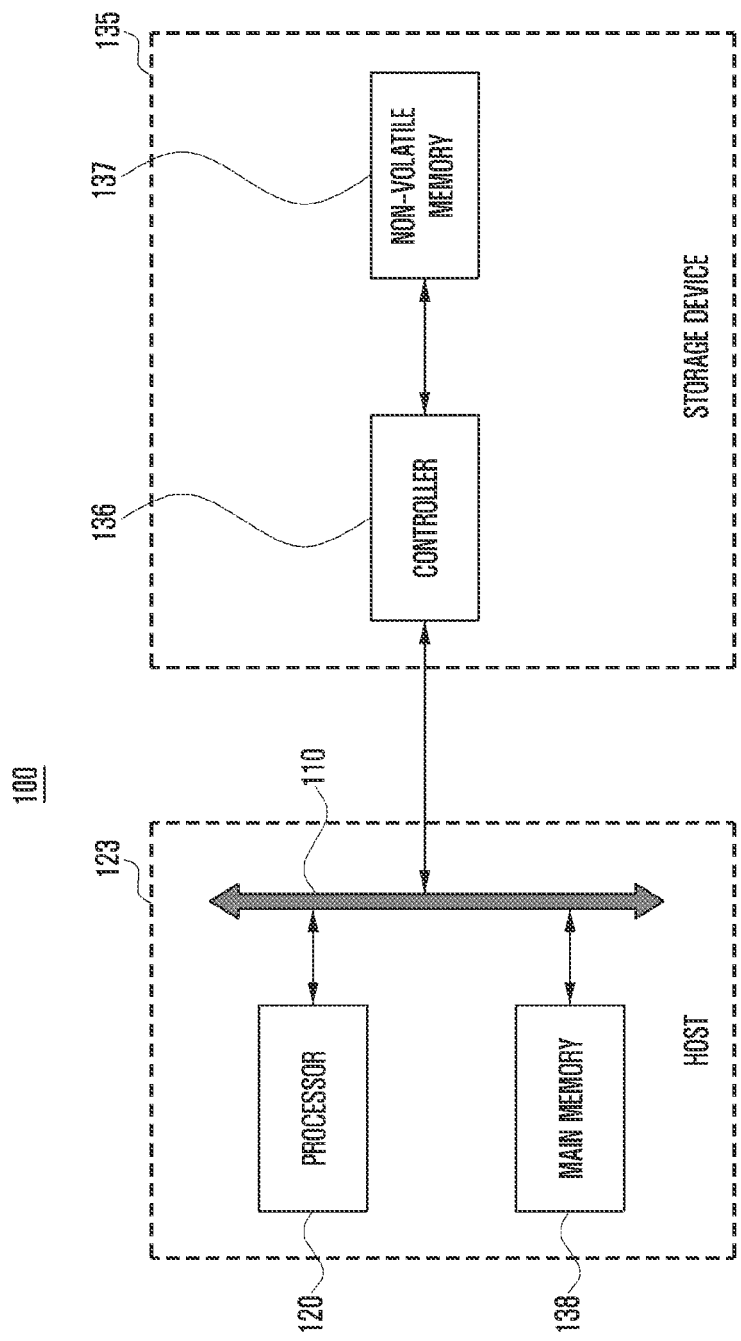
FIG. 4 is a block diagram illustrating a memory management system of an electronic device according to various embodiments of the present disclosure.

FIG. 4 is a block diagram illustrating a memory management system of an electronic device according to an embodiment of the present disclosure.

Referring to FIG. 4, a memory management system of the electronic device 100 includes a host 123 and a storage device 135.

The host 123 may include the bus 110, the processor 120, and a main memory 138. For example, the bus 110 and the processor 120 included in the host 123 may be the same as the above described devices.

When the processor 120 loads a new page to the main memory 138, the processor 120 may perform a swap operation if the memory 138 lacks an unused memory or has a memory smaller than or equal to a predetermined level. The swap operation is an operation of storing at least one of the pages loaded to the main memory 138 in the storage device 135 as swap data in order to secure a storage space of the new page.

The processor 120 may be connected to the main memory 138 through the bus 110 including an address bus, a control bus, and/or a data bus.

The processor 120 may configure a swap data amount per unit time, which may be written in a non-volatile memory 137 in consideration of at least one of a storage capacity, a planned lifespan and a usage environment. For example, the processor 120 may configure the swap data amount per unit time as 100 Mb (100 Mb/daily) per day or 10 Mb (10 Mb/hour) per hour. The unit time and the swap data per unit time may be calculated by the processor 120 considering at least one of the storage capacity, the design life, and the usage environment of the non-volatile memory 137 or may be configured by a user, a manufacturer, or a service provider. A default value may be provided to help in the user's configuration. The default value may be a value calculated by the processor 120 or provided by a manufacturer or a service provider based on a use pattern. Alternatively, the default value may be a value determined by a combination of the above methods.

According to an embodiment, the user may configure swap data for each of one or more applications 134. For example, among the applications 134, an application supporting a three dimensional game encounters a situation in which an unused area becomes smaller than or equal to a predetermined level in the main memory 138 to process a large amount of data. The user may identify an application which frequently uses the main memory to configure the swap data amount. The electronic device 100 may store at least one of the pages loaded to the main memory 138 in the storage device 135 as the swap data according to swap data amount information for each of the applications 134 configured by the user. The configuration by the user may be stored or a user interface may be provided to modify the configuration. The swap data amount may be configured for each of the applications 134 by the processor 120 considering memory use amount information instead of the configuration by the user.

When a new page is loaded to the main memory 138, the processor 120 determines whether the main memory 138 lacks unused pages or the unused pages are smaller than or equal to a predetermined level. When the main memory 138 lacks unused pages or the unused pages are smaller than or equal to a predetermined level, the processor 120 may transmit at least one of a plurality of pages to the storage device 135 as the swap data.

At this time, the processor 120 may determine whether to transmit the swap data to the storage device 135 based on the configured swap data amount per unit time. When a swap data amount pre-transmitted to the storage device 135 reaches the configured swap data amount per unit time, the processor 120 may not transmit the swap data to the storage device 135. When a swap data amount pre-transmitted to the storage device 135 does not reach the configured swap data amount per unit time, the processor 120 may transmit the swap data to the storage device 135. Even though the swap data amount reaches an acceptable swap data amount, additional transmission may be permitted within a predetermined range according to a certain condition (e.g., a task priority or importance of a response speed).

When the total amount of configured swap data per unit time is not used during the unit of time or the electronic device 100 reaches a predetermined time within the unit time, the processor 120 may re-configure the swap data amount per unit time of a next unit time to use the remaining swap data. Referring to Table 1, when the total amount of configured swap data per unit time is used during the unit time or the electronic device 100 reaches a predetermined time within the unit time, the processor 120 may carry the remaining swap data forward to a next unit time and re-configure the swap data amount per unit time which will be described below.

TABLE 1

|  | unit time | | | | |
| --- | --- | --- | --- | --- | --- |
| Swap data | 100 Mb/day (first day) | 100 Mb/day (second day) | 100 Mb/day (third day) | 100 Mb/day (four day) | ... |
| Actual use amount of swap data | 50 Mb/day | 40 Mb/day | 10 Mb/day | 250 Mb/day | ... |
| Swap data carried forward to next unit time | 100 Mb/day (configured swap data/unit time)- 50 MB/day (actual use amount of swap data) = 50 Mb/day | 150 Mb/day (reconfigured swap data/unit time)- 40 Mb/day (actual use amount of swap data = 110 Mb | 200 Mb | 0 Mb | ... |
| Reconfigured swap data/ unit time | — | 50 Mb(swap data carried forward) + 100 Mb(pre-configured swap data/unit time) = 150 Mb/day | 210 Mb/day | 250 Mb/day | ... |

For example, in Table 1, the processor 120 may configure the swap data per unit time such that swap data of 100 Mb may be written in the non-volatile memory 137 per day. During the first day, when the electronic device 100 actually uses 50 Mb of swap data, the processor 120 may re-configure the swap data amount per unit time of the next unit time such that the remaining swap data of 50 Mb may be used during the next unit time (that is, the second day). During the second day, the processor 120 may re-configure the swap data per unit time such that swap data of 150 Mb may be transmitted to the non-volatile memory 137 during the day. During the second day, when the electronic device 100 actually uses the 40 Mb of swap data, the processor 120 may re-configure the swap data amount per unit time of the next unit time such that the remaining 210 Mb of swap data may be used during the next unit time (that is, the third day). During the third day, when the electronic device 100 actually uses 10 Mb of swap data, the processor 120 may carry the remaining 200 Mb of swap data forward to the next unit time (that is, the fourth day). Accordingly, during the fourth day, the processor 120 may re-configure the swap data per unit time and transmit 300 Mb of swap data to the non-volatile memory 137 during the day. However, the processor 120 may configure a maximum value of swap data amount per unit time to guarantee a planned lifespan of the non-volatile memory 137. For example, the maximum value of the swap data amount per day is configured as 250 Mb in Table 1. Accordingly, during the fourth day, the processor 120 may re-configure the swap data amount per unit time to be 250 MB instead of 300 Mb per day.

According to an embodiment, the processor 120 may change the swap data per unit time according to a use time point. The processor 120 may configure different swap data amounts per unit time at every time point by predicting a particular time when the swap data use amount is large.

For example, although the swap data allocated to every-day (e.g., swap data per unit time) is the same as 100 Mb/day in Table 1, the processor 120 may configure the swap data per unit time as 500 Mb/day in the first day and as 100 Mb/day thereafter. For example, since the applications 134 to be installed or used may be large on the first day in which the electronic device 100 is first used, the swap data amount per unit time may be differently configured at every particular time point based on the above fact.

The main memory 138 is a memory, which may exchange data with the processor 120 and is used in a process of executing an Operating System (OS) or an application run by the processor 120. The main memory 138 may store an address translation table for converting a logical address received from the processor 120 to a physical address the non-volatile memory 137.

The main memory 138 may be divided into a plurality of segments or pages. When a new page is required to be loaded to the main memory 138, the main memory 138 lacks unused pages, or the unused pages are smaller than or equal to a predetermined level, a swap-out operation of writing at least one of the plurality of pages in the non-volatile memory 137 as the swap data may be performed. For example, the page written in the non-volatile memory 137 may be a Least Recently Used (LRU) page. When an access to the page stored in the non-volatile memory 137 is required, the page may be written in the main memory 138 by a swap-in operation.

For example, the main memory 138 may include a Dynamic Random Access Memory (DRAM). According to another example, the main memory 138 may include a Static Random Access Memory (SRAM), a flash memory, a Phase Change Random Access Memory (PCRAM), a Ferroelectric Random Access Memory (FRAM), a Resistive Random Access Memory (RRAM), or a Magnetic Random Access Memory (MRAM).

The storage device 135 may include a controller 136 and at least one non-volatile memory 137. For example, the main memory 138 and the storage device 135 may be the same as the above described memory 130. The controller 136 may be included in the host 123 instead of the storage unit 135.

The controller 136 may receive a command from the host 123 and respond to the command, so as to control an operation of the storage device 135.

The non-volatile memory 137 may store data provided from the host 123. The non-volatile memory 137 may preserve the stored data even though power supply is blocked. The non-volatile memory 137 may be used as a swap memory of the host 123. For example, the non-volatile memory 137 may include a NAND flash memory, a NOR flash memory, a PCRAM, a FRAM, a RRAM, or a MRAM.

The non-volatile memory 137 may include at least one swap partition or an area having a similar function thereto and further include a data partition and the like. When at least one partition or an area having a similar function exists in the non-volatile memory 137, the non volatile memory 137 may include a partition table having information on the partition or area or a similar information area. The controller 136 may extract an address of the swap partition from the partition table and generate a swap address table including address information of the swap data based on the extracted address of the swap partition. According to an embodiment, the swap address table may be stored in the non-volatile memory 137 or stored in another memory within the controller 136. According to an embodiment, the swap address table may include a logical address or a physical address of the swap data.

When the controller 136 receives data from the host 123, the controller 136 may determine whether the received data is the swap data based on the address information stored in the swap address table. For example, when the address of the received data exists within the swap address table, the controller 136 may determine the received data as the swap data. When the address of the received data does not exist within the swap data table, the controller 136 may determine the received data as general or abnormal data.

The swap address table stores a physical address of the swap data. The controller 136 may convert a logical address of the received data to the physical address and then determine whether the physical address of the received data exists within the swap address table. According to another embodiment, the swap address table stores a logical address of the swap data. The controller 136 may determine whether the logical address of the received data exists within the swap address table.

Figure 5:
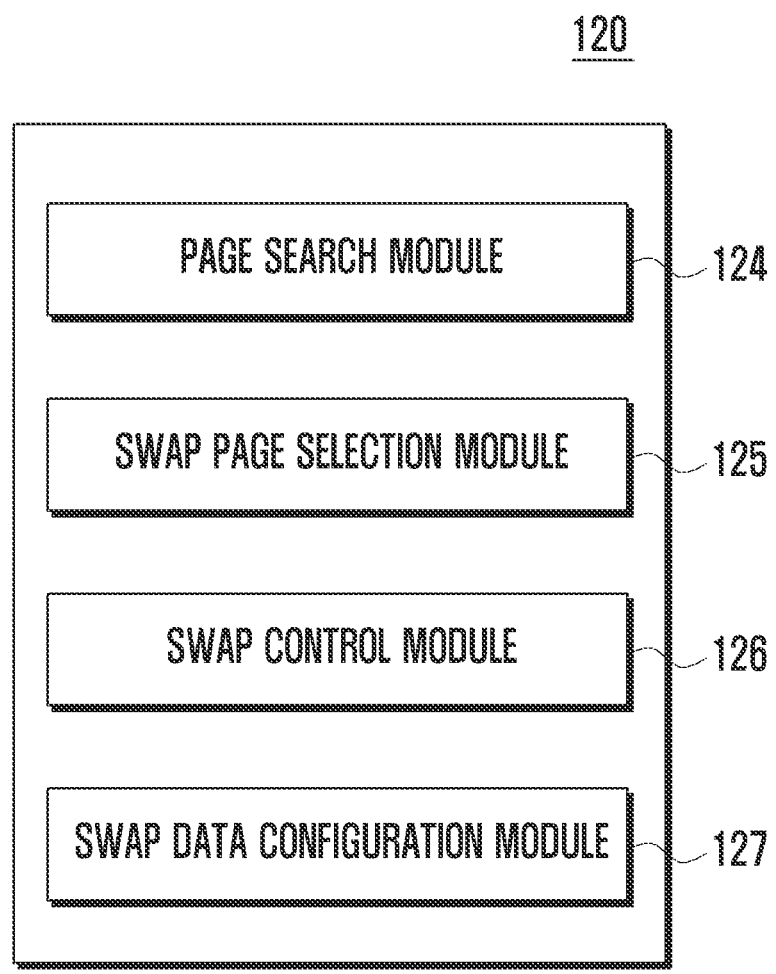
FIG. 5 is a block diagram of a processor according to various embodiments of the present disclosure.

FIG. 5 is a block diagram of a processor according to an embodiment of the present disclosure.

Referring to FIG. 5, the processor 120 may include a page search module 124, a swap page selection module 125, and a swap control module 126. The processor 120 may further include a swap data configuration module 127.

The page search module 124 searches for an empty page in the non-volatile memory 137 used as the swap memory. The swap page selection module 125 selects a page to be swapped, by using an existing page swap algorithm (e.g., FIFO, LRU, LFU, and NUR algorithms) and manages information for selecting the page to be swapped. The swap control module 126 swaps data of the page to be swapped for the empty page found by the page search module 124. To this end, the swap control module 126 may include information on the page to be swapped and information on the empty page to be transmitted to the controller 136.

The swap data configuration module 127 may configure the swap data amount per unit time, which may be written in the non-volatile memory 137. At this time, the swap control module 126 may determine whether to transmit the swap data to the storage device 135 based on the configured swap data amount per unit time. When a swap data amount pre-transmitted to the storage device 135 reaches the configured swap data amount per unit time, the swap control module 126 may not transmit the swap data to the storage device 135. When a swap data amount pre-transmitted to the storage device 135 does not reach the configured swap data amount per unit time, the swap control module 126 may transmit the swap data to the storage device 135.

When the electronic device 100 has not used all the swap data per unit time, the swap data configuration module 127 may re-configure the swap data amount per unit time by carrying the remaining swap data forward to the next unit time. The swap data configuration module 127 may configure a maximum value of the swap data amount per unit time. For example, when the swap data configuration module 127 re-configures the swap data amount per unit time, the swap data configuration module 127 may configure the maximum value of the swap data amount per unit time.

Although the components of the processor 120 illustrated in FIG. 5 are illustrated to be functionally or logically separated from each other, the components do not have to be physical devices or codes separated from other.

Figure 6:
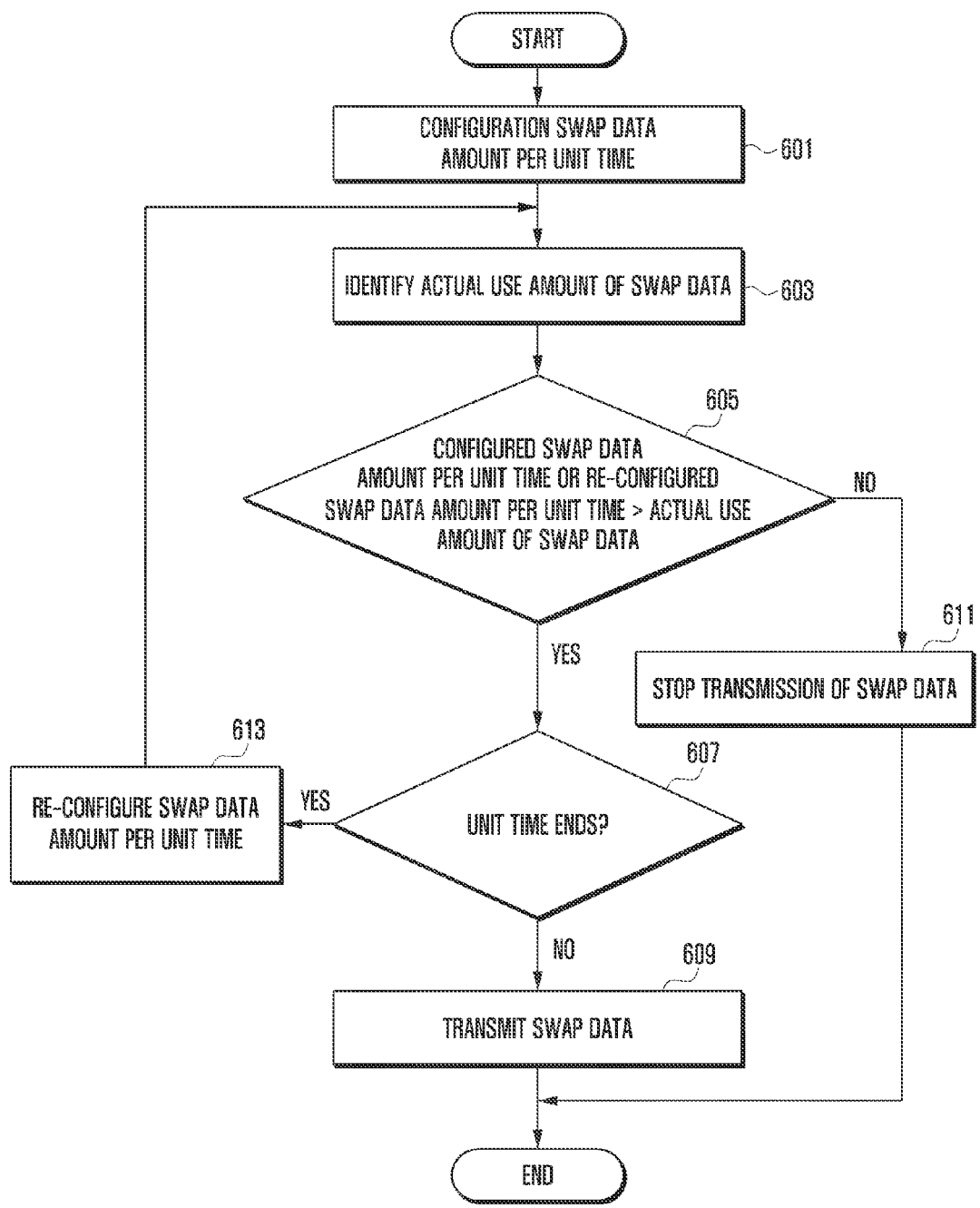
FIG. 6 is a flowchart illustrating a method of managing a memory by an electronic device according to various embodiments of the present disclosure.

FIG. 6 is a flowchart illustrating a method of managing a memory by an electronic device according to an embodiment of the present disclosure.

Referring to FIG. 6, the electronic device 100 may configure a swap data amount per unit time in operation 601. For example, the electronic device 100 may configure the swap data amount per unit time, which may be written in the non-volatile memory 137 in operation 601.

According to an embodiment, the processor 100 may change the swap data per unit time according to a use time point in operation 601. The electronic device 100 may configure different swap data amounts per unit time at every time point by predicting a particular time when the swap data use amount is large in operation 601. The electronic device 100 may identify an actual use amount of the swap data of the electronic device 100 in operation 603.

The electronic device 100 may determine whether the actual use amount of the configured swap data reaches the configured swap data amount per unit time or the re-configured swap data amount per unit time in operation 605. For example, the electronic device 100 may determine whether to transmit the swap data to the storage device 135 based on the configured swap data amount per unit time or the re-configured swap data amount per unit time in operation 605.

When a pre-transmitted swap data amount (e.g., the actual use amount of the swap data) reaches the configured swap data amount per unit time, the electronic device 100 may stop transmission of the swap data to the non-volatile memory 137 in operation 611.

When the pre-transmitted swap data amount (e.g., the actual use amount of the swap data) does not reach the configured swap data amount per unit time, the electronic device 100 may proceed to operation 607 to determine whether the unit time ends.

The electronic device 100 may determine whether the unit time ends in operation 607, and proceeds to operation 609 when the unit time does not end. When the unit time does not end, the electronic device 100 may transmit the swap data to the non-volatile memory 137 in operation 609.

When the electronic device 100 determines that the unit time ends, the electronic device 100 may re-configure the swap data amount per unit time in operation 613. For example, in operation 613, when the electronic device 100 determines that the unit time ends, the electronic device may re-configure the swap data amount per unit time by adding up the swap data amount per unit time pre-configured in operation 601 and swap data amounts which have not been used before the unit time ends.

For example, in operation 613, the electronic device 100 may limit the swap data amount re-configured by adding up the pre-configured swap data amount per unit time and the swap data amounts which have not been used before the unit time ends to a preset maximum value. For example, in operation 613, when the swap data amount re-configured by adding up the pre-configured swap data amount per unit time and the swap data amounts which have not been used before the unit time ends exceeds the maximum value, the maximum value becomes the re-configured swap data amount per unit time.

According to another embodiment, when the swap data amount reaches the maximum value, the re-configuration may not be made. That is, the remaining swap data may not be carried forward.

According to another embodiment, even though there is some swap data remaining which may be carried forward, the remaining swap data may not be carried forward or an amount of the swap data to be carried forward may be limited according to a condition (e.g., a planned lifespan of the non-volatile memory, a time point, a time, a user's configuration, or a system load). According to the above embodiment, a condition where the maximum value is continuously maintained due to the swap data carried forward may be prevented.

According to another embodiment, the maximum value may vary depending on a condition (e.g., a planned lifespan of the non-volatile memory, a time point, a time, a user's configuration, or a system load).

According to another embodiment, the swap data amount per unit time may be re-configured after the unit time elapses or at a predetermined time within the unit time.

Figure 7:
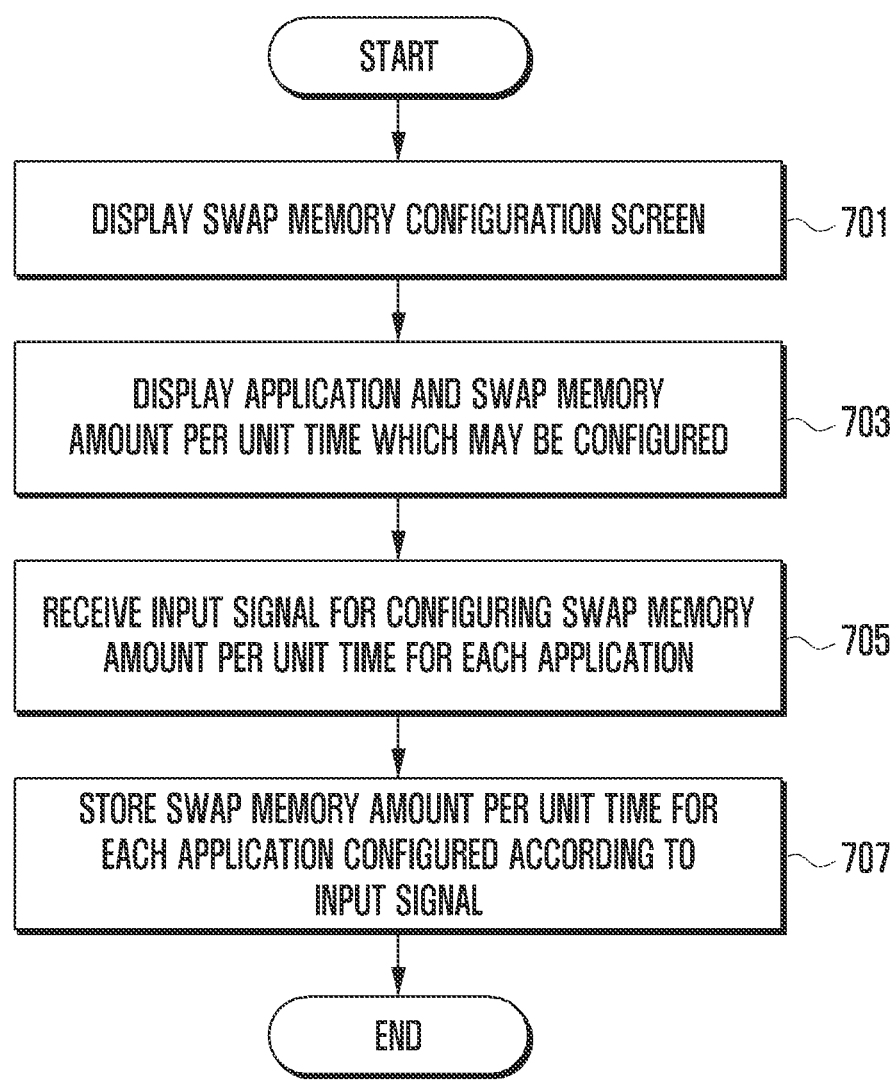
FIG. 7 is a flowchart illustrating a method of configuring swap data by an electronic device according to an embodiment of the present disclosure.

FIG. 7 is a flowchart illustrating a method of configuring swap data by an electronic device according to an embodiment of the present disclosure.

Figure 8:
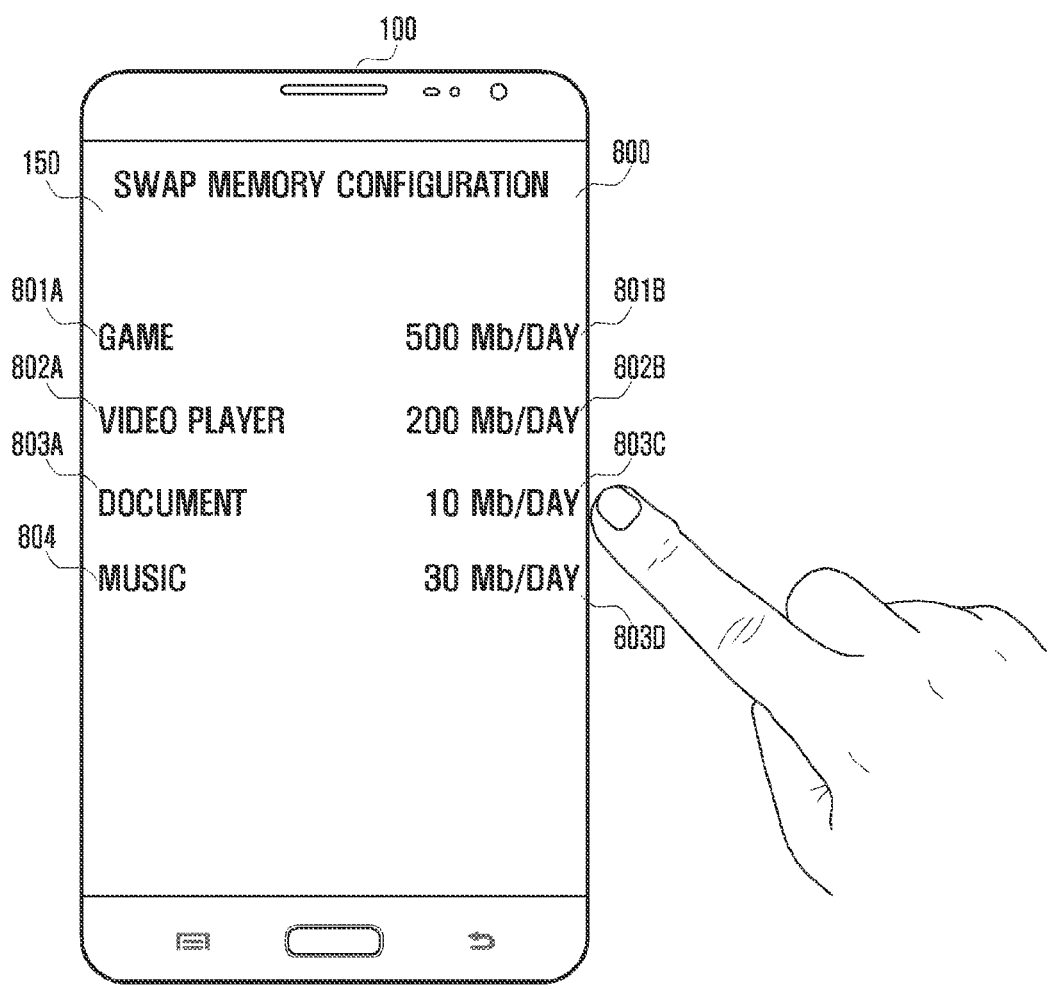
FIG. 8 is a view describing a method of configuring swap data by electronic device according to an embodiment of the present disclosure.

FIG. 8 is a view describing a method of configuring swap data by an electronic device according to an embodiment of the present disclosure.

Referring to FIGS. 7 and 8, the electronic device 100 may display a swap memory configuration screen 800 on the display 150 in operation 701. The electronic device 100 may display one or more applications 801A, 802A, 803A, and 804 and swap memory amounts per unit time 801B, 802B, 803C, and 803D which may be configured for each of the one or more applications in operation 703.

The electronic device 100 may receive a user input signal for configuring a swap memory amount per unit time of each of the one or more applications in operation 705. The electronic device 100 may store the swap memory amount per unit time of each of the one or more applications configured according to a user input signal in operation 707.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of managing a memory by an electronic device, the method comprising:
   configuring a swap data amount per unit time;
   identifying an actual use amount of swap data;
   comparing the identified actual use amount of the swap data with the configured swap data amount per unit time; and
   re-configuring the swap data amount per unit time, wherein the re-configuring of the swap data amount per unit time comprises:
      adding up the configured swap data amount per unit time and swap data amounts which have not been used before the unit time ends; and
      limiting the re-configured swap data amount per unit time within a present maximum value.

2. The method of claim 1, further comprising stopping transmission of the swap data when the identified actual use amount of the swap data reaches the configured swap data amount per unit time.

3. The method of claim 1, further comprising:
   determining whether the unit time ends when the identified actual use amount of the swap data does not reach the configured swap data amount per unit time; and
   transmitting the swap data when the unit time does not end.

4. The method of claim 1, wherein the configuring of the swap data amount per unit time comprises configuring the swap data amount per unit time based on at least one of a planned lifespan, a storage capacity, and a use environment of a swap memory.

5. The method of claim 1, wherein the configuring of the swap data amount per unit time comprises variably configuring the swap data amount per unit time according to a use time point.

6. The method of claim 1, wherein the configuring of the swap data amount per unit time comprises:
   configuring the swap data amount per unit time;
   displaying a swap memory configuration screen;
   displaying at least one application and a swap memory amount per unit time which is configured for each of the at least one application;
   receiving a user input signal for configuring the swap memory amount per unit time for each of the at least one application; and
   storing the swap memory amount per unit time for each of the configured at least one application according to the user input signal.

7. An electronic device comprising;
   a non-volatile memory device; and
   a processor configured to:
      configure a swap data amount per unit time,
      identify an actual use amount of swap data,
      compare the identified actual use amount of the swap data with the configured swap data amount per unit time, and
      re-configure the swap data amount per unit time by adding up the configured swap data amount per unit time and swap data amounts which have not been used before the unit time ends and limiting the reconfigured swap data amount per unit time within a preset maximum value.

8. The electronic device of claim 7, wherein the processor is further configured to stop transmitting the swap data to the non-volatile memory when the identified actual use amount of the swap data reaches the configured swap data amount per unit time.

9. The electronic device of claim 7, wherein the processor is further configured to determine whether the unit time ends when the identified actual use amount of the swap data does not reach the configured swap data amount per unit time, and transmits the swap data when the unit time does not end.

10. The electronic device of claim 7, wherein the processor is further configured to configure the swap data amount per unit time based on a planned lifespan and a storage capacity of a swap memory.

11. The electronic device of claim 7, wherein the processor is further configured to variably configure the swap data amount per unit time according to a use time point.

12. The electronic device of claim 7, the processor is further configured to re-configure the swap data amount per unit time as an aggregation of an amount of unused swap data for previous per unit time.

13. An electronic device comprising:
a display;
a non-voiatiie memory device; and
a processor configured to:
  display a swap memory configuration screen on the display,
  display at least one application and a swap memory amount per unit time which is configured for the at least one application, and
  display a re-configured swap memory amount per unit time configured for the at least one application, wherein the re-configured swap memory amount per unit time is determined by:
    adding up the swap memory amount per unit time configured for the at least one application and swap data amounts which have not been used before the unit time ends; and limiting the re-configured swap memory amount per unit time within a preset maximum value.

14. The electronic device of claim 13, wherein the processor is further configured to:
receive a user input signal for configuring the swap memory amount per unit time for each of the at least one application from an input/output interface, and
store the swap memory amount per unit time for each of the configured at least one application according to the user input signal in the memory.

* * * * *